United States Patent
Booth (10) Patent No.: US 9,012,753 B2
(45) Date of Patent: Apr. 21, 2015

(54) MUSIC INSTRUCTION APPARATUS (71) Applicant: LaSaundra J Booth, Durham, NC (US)

(72) Inventor: LaSaundra J Booth, Durham, NC (US)

(*) Notice: Subject to any disclaimer, the term of this patent is extended or adjusted under 35 U.S.C. 154(b) by 31 days.

(21) Appl. No.: 13/840,011

(22) Filed: Mar. 15, 2013

(65) Prior Publication Data
US 2014/0260902 A1 Sep. 18, 2014

(51) Int. Cl.
G09B 15/00 (2006.01)

(52) U.S. Cl.
CPC ..................................... G09B 15/00 (2013.01)

(58) Field of Classification Search
CPC ........................................................ G09B 15/00
USPC ............................................ 84/297 R, 477 R
See application file for complete search history.

(56) References Cited

U.S. PATENT DOCUMENTS

| | | | | |
|---|---|---|---|---|
| 16,995 A * | 4/1857 | Randle | 84/297 R |
| 936,624 A * | 10/1909 | Hale | 84/297 R |
| 1,113,390 A * | 10/1914 | Wenzel-Schmidt | 84/455 |
| 1,416,568 A * | 5/1922 | Mazzocco | 84/297 R |
| 1,617,102 A * | 2/1927 | Cohn | 84/297 R |
| 1,684,057 A * | 9/1928 | Fisher | 84/297 R |
| 2,070,916 A * | 2/1937 | Peate | 84/297 R |
| 2,130,248 A * | 9/1938 | Peate | 84/297 R |
| 2,514,835 A * | 7/1950 | Bredice | 84/297 R |
| 3,099,595 A * | 7/1963 | Allbaugh | 156/172 |
| 3,120,144 A * | 2/1964 | Bayer | 84/199 |
| 3,130,626 A * | 4/1964 | Martin | 84/297 S |
| 3,163,076 A * | 12/1964 | White | 84/419 |
| 3,403,588 A * | 10/1968 | Downing | 84/306 |
| 3,667,336 A * | 6/1972 | Itzler et al. | 84/454 |
| 3,820,434 A * | 6/1974 | Roberts | 84/297 R |
| 3,978,756 A * | 9/1976 | Feldman | 84/470 R |
| 4,130,045 A * | 12/1978 | Walker | 84/297 R |
| 4,164,806 A * | 8/1979 | Stone et al. | 29/517 |
| D275,686 S * | 9/1984 | Beasley | D17/20 |
| 5,704,473 A * | 1/1998 | Oster | 206/314 |
| 5,920,023 A * | 7/1999 | Ravagni et al. | 84/485 R |
| 6,452,080 B1 * | 9/2002 | Coonce | 84/477 R |
| 7,115,806 B2 * | 10/2006 | Holland | 84/454 |
| 7,408,101 B2 * | 8/2008 | Shelton | 84/297 S |
| 7,541,528 B2 * | 6/2009 | Lyles | 84/312 R |
| 7,714,217 B2 * | 5/2010 | Nesbitt | 84/297 S |
| 8,362,344 B2 * | 1/2013 | Nesbitt | 84/297 S |
| 2005/0011332 A1 * | 1/2005 | Dronge | 84/297 S |
| 2009/0181156 A1 * | 7/2009 | Nesbitt et al. | 427/2.1 |
| 2014/0260902 A1 * | 9/2014 | Booth | 84/477 R |

* cited by examiner

Primary Examiner — Robert W Horn
(74) Attorney, Agent, or Firm — Amardeep S. Grewal; Gerard M. Donovan; Reed Smith LLP (57) ABSTRACT A music instruction apparatus includes a string adapted to be wound into a tuning peg of a string instrument, a tension indicator disposed on the string proximate to an end of the string, the tension indicator representing a predetermined level of tension in the string when the end of the string is wound into the tuning peg up to the position of the tension indicator, and a note indicator disposed on the string, the note indicator representing a musical note.

20 Claims, 10 Drawing Sheets

Peg End     401     400     402     Tailpiece End

MUSIC INSTRUCTION APPARATUS

BACKGROUND

String instruments include instruments such as the violin, viola, cello, double bass (sometimes called the contrabass), and harp. String instruments can be very challenging to learn and to teach, in part because mastery of string instruments requires knowledge of and experience with all of their interconnected components.

Figure 1:
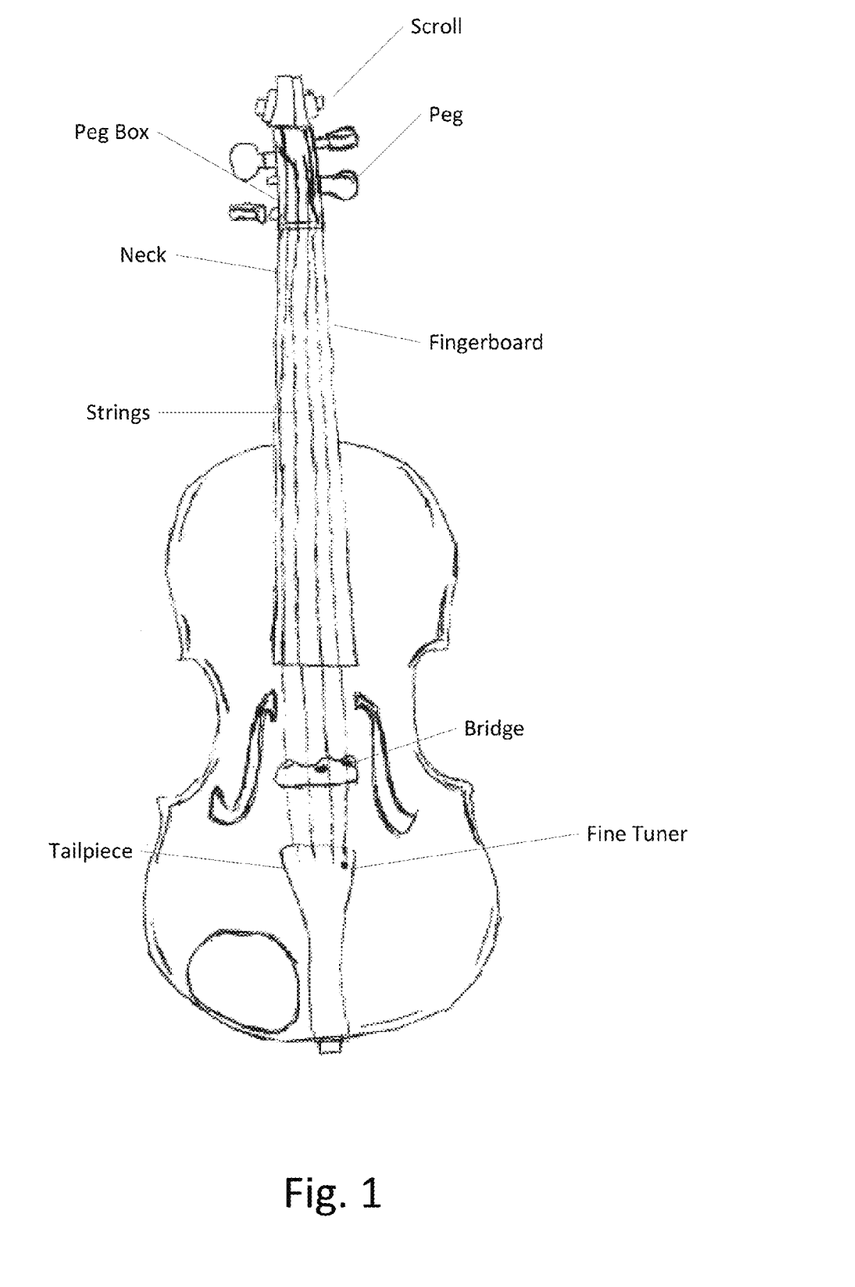
FIG. 1 is a diagram of the components that make up a violin.

The violin, viola, cello, and double bass all consist of a body, a curved, hollow section made of wood where the sound resonates, and a neck, a straight piece that extends from the body with four strings stretched along it, attached to tuning pegs at the end. For example, FIG. 1 illustrates a diagram of violin and its component parts.

Part of learning to play these instruments involves learning how to string and tune each of the musical strings. A string is made from a core, and then layers of a synthetic material or metal compound is wrapped around the core to make the string. After the string is made, a "silking" is applied. This "silking" is comprised of a colored wrapping made out of fine fibers. These fibers are wrapped at the upper and lower ends of the strings. The silking can be used to identify the brand, and to make the upper portion of the string sturdy by absorbing tension as the string is initially threaded through the hole inside of each peg and wrapped in the peg box to a desired pitch.

Frequently, when strings are purchased in a set, there are no instructions as to how to differentiate one string from the next. An experienced musician would understand that he or she would have to separate all strings and then place them in order from thinnest to thickest in order to figure out where each string should be placed inside the peg box. However, the inexperienced musician would not know to do this without help.

Figure 2:
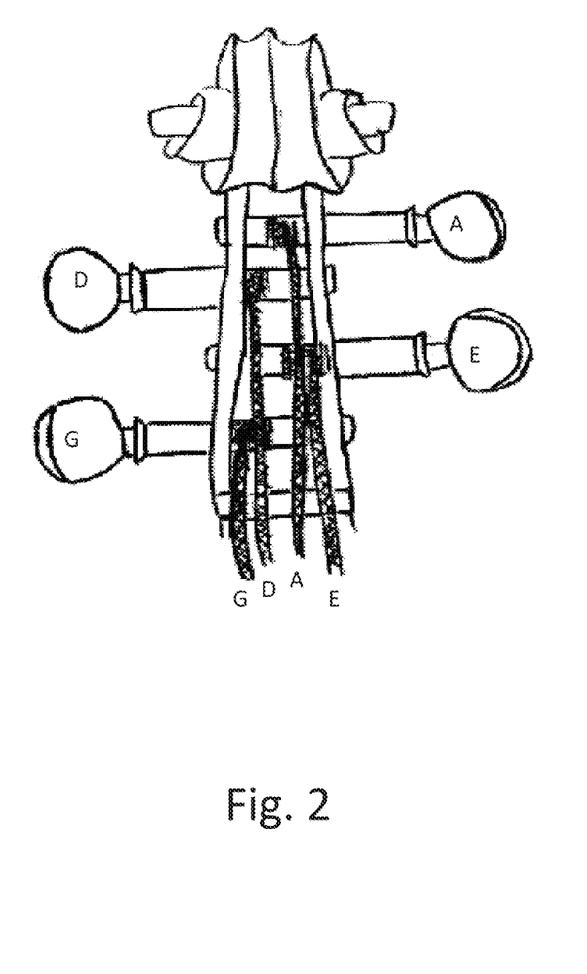
FIG. 2 is an enlarged view of the peg box of a violin.

Since each peg on a fretless instrument, such as a violin, receives a specific string, a string may break because a consumer may be unfamiliar of where to place a string inside the peg box. FIG. 2 illustrates an example peg box containing the four pegs used in violins, along with the corresponding strings. Each string is a specific length and width. For example, the G string on the violin is the thickest string. The D string on a violin is wider than an A string, but an E string on the violin is the thinnest string of all four strings. If a consumer does not know how to distinguish the differences between each string, he or she may place the strings in the wrong pegs. This will cause strings to pop or break prematurely.

Tuning the instrument can also be difficult, as a string may also break when a user turns the peg past its tension point when trying to tune the string. Even when a string does not break, tuning string instruments is a problem for novice instrumentalists and to those who have difficulty with pitch recognition.

Further complicating the learning process is the fact that fretless instruments are unlike most other instruments because each string contains a variation of intervals and overtones. For example, on a piano keyboard, the keys are spaced in intervals consisting of either whole steps or half steps. There is no interval lower than a half step. Unlike the piano, the strings on fretless instruments contain intervals that can be played lower than half steps. The reason is because each pitch on a string is relative to where an instrumentalist places his or her fingers on the fingerboard of the instrument. Without frets, there is no guarantee that an instrumentalist will place his or her finger on the fingerboard exactly one whole step or exactly one half step from the starting pitch.

DETAILED DESCRIPTION

While apparatuses are described herein by way of examples and embodiments, those skilled in the art recognize that apparatuses for music instruction are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to. Although many of the examples used throughout this application refer to a violin, the apparatus can be used with any string instrument, including a viola, cello, bass, guitar, double bass, fiddle, and the like.

Applicant has discovered an apparatus for music instruction which reduces the likelihood of broken strings, provides indicators which aid users in stringing and tuning instruments, allows users to easily differentiate between strings, and aids users in correct finger placement when playing fretless instruments.

Figure 3:
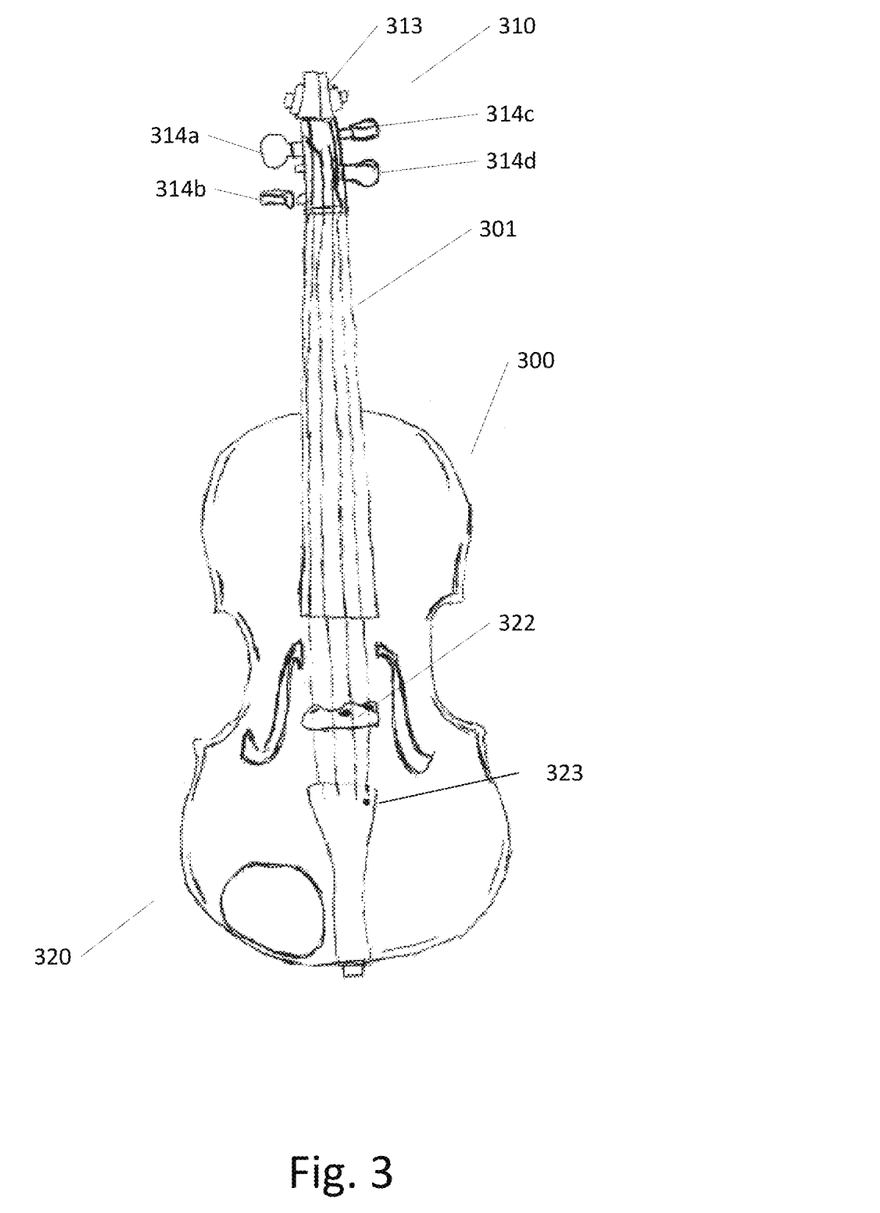
FIG. 3 illustrates a violin, the violin peg box area, and the violin tail area.

FIG. 3 shows a violin, 300, including the peg box end 310 and the tail piece end 320 of the violin. The neck 301 carries the fingerboard, typically made of ebony, but often some other wood stained or painted black. At the peg box end 310 of the fingerboard sits a small nut, infrequently called the upper saddle, with grooves to position the strings as they lead into the pegbox. The scroll 313 at the end of the pegbox provides essential mass to tune the fundamental body resonance of the instrument, and provides a convenient grip for spare fingers to brace against when tuning one-handed, with the violin on the shoulder. Each of the pegs 314a, 314b, 314c, and 314d are tuning pegs which correspond to different musical strings. In this case, 314a, 314b, 314c, and 314d correspond to D, G, A, and E, respectively. On the tail piece end, the bridge 312 forms the lower anchor point of the vibrating length of the strings, and transmits the vibration of the strings to the body of the instrument. Its top curve holds the strings at the proper height from the fingerboard, permitting each to be played separately by the bow. The four violin strings run from the tailpiece attached to the base, across the bridge 312, continue towards the neck 301 of the instrument running parallel to the fingerboard, and connect to the pegbox located at the very top of the violin 300. The bridge 312 of the violin helps to hold the strings in place, while the pegs 314a, 314b, 314c, and 314d maintain the tension necessary to produce vibration.

Due to the degree of variations in overtones that can be heard while playing open strings, many fretless instruments are built with fine tuners 323 located on the top of the tail piece of the instrument. Fine tuners 323 allow for the pitch of the open string to be adjusted when the string is off pitch by intervals lower than a half step. Sometimes the pitch is only slightly sharp or flat, and a peg turn is not needed.

Figure 4A:
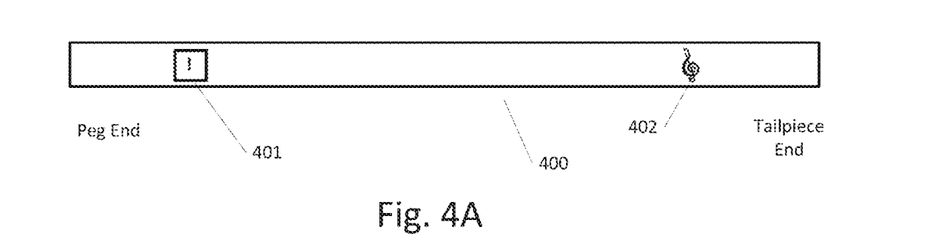
FIG. 4A illustrates an apparatus for music instruction according to a disclosed embodiment.

An apparatus will be described according to an exemplary embodiment. FIG. 4A shows a depiction of a string 400 adapted to be wound into a tuning peg of a string instrument. Of course, the depiction is not to scale, and is shown with exaggerated dimensions for the purpose of explanation and clarity. Proximate to an end of the string 400 that is wound into the tuning peg is a tension indicator 401. The tension indictor 401 is represented as a symbol for the purpose of explanation only. The tension indicator 401 can be implemented as a colored section of the string, a strip of color, a special texture, a ribbon attached to the string, a colored sleeve which surrounds the string, or any other visual or tactile indicator.

Figure 4B:
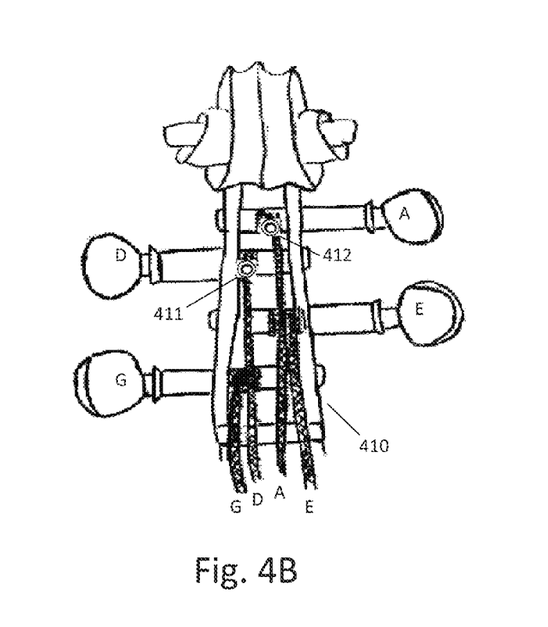
FIG. 4B illustrates a reference point for the measuring positions of the tension indicators.

The tension indicator 401 is used to represent a predetermined level of tension in the string when the end of the string is wound into the tuning peg up to the position of the tension indicator. For examples of this position, FIG. 4B shows four strings wound into a peg box 410. The A string is wound into the corresponding tuning peg up to the point shown at symbol 412, and the D string is wound into the corresponding tuning peg up to the point shown at symbol 411.

The tension indicator can be used to display to a novice user of the string instrument information about the tension of the string that is not otherwise easily ascertainable. For example, to help reduce the number of strings that are broken by students winding the string too tightly around a peg, the tension indicator can act as a failsafe, representing that the student should not wind the string past the point of the tension indicator, at the increased risk of the string snapping. In other words, the tension indicator can be used to represent a "very high tension" level for the particular string. Of course, this tension level can vary depending on the musical string, as each of the musical strings varies in terms of length and thickness.

The tension indicator does not have to be a discrete point, and can span a predetermined distance of the string, for example, a strip of color that spans some distance of the string. In this case, the tension indicator can represent a predetermined level of tension in the string when the end of the string is wound into the tuning peg up to a position within the span of the tension indicator.

Also shown in FIG. 4A, a note indicator 402 is disposed on the string 400. Similar to the tension indicator 401, the note indicator is represented as a symbol for the purpose of explanation only, and can be implemented as a colored section of the string, a strip of color, a special texture, a ribbon attached to the string, a colored sleeve which surrounds the string, or any other visual or tactile indicator. For example, a special texture can be used as a note indicator for users who are visually impaired.

The note indicator 402 can be used to aid users in distinguishing between different strings. For example, the G string may have a note indicator in the form of a section that is colored yellow, the D string may have a section that is colored blue, the A string may have a section that is colored green, and the E string may have a section that is colored red. Of course, a violin is presented only as an example, and the string 400 and indicators 401 and 402 may be used with other string instruments. For example, a cello or viola can have a note indicator for a C string that is a section of string that is colored purple. Additionally, the note indicator can be integrated within the tension indicator, for example, by using striped colors. Many variations are possible, and these examples are not intended to be limiting.

Figure 5:
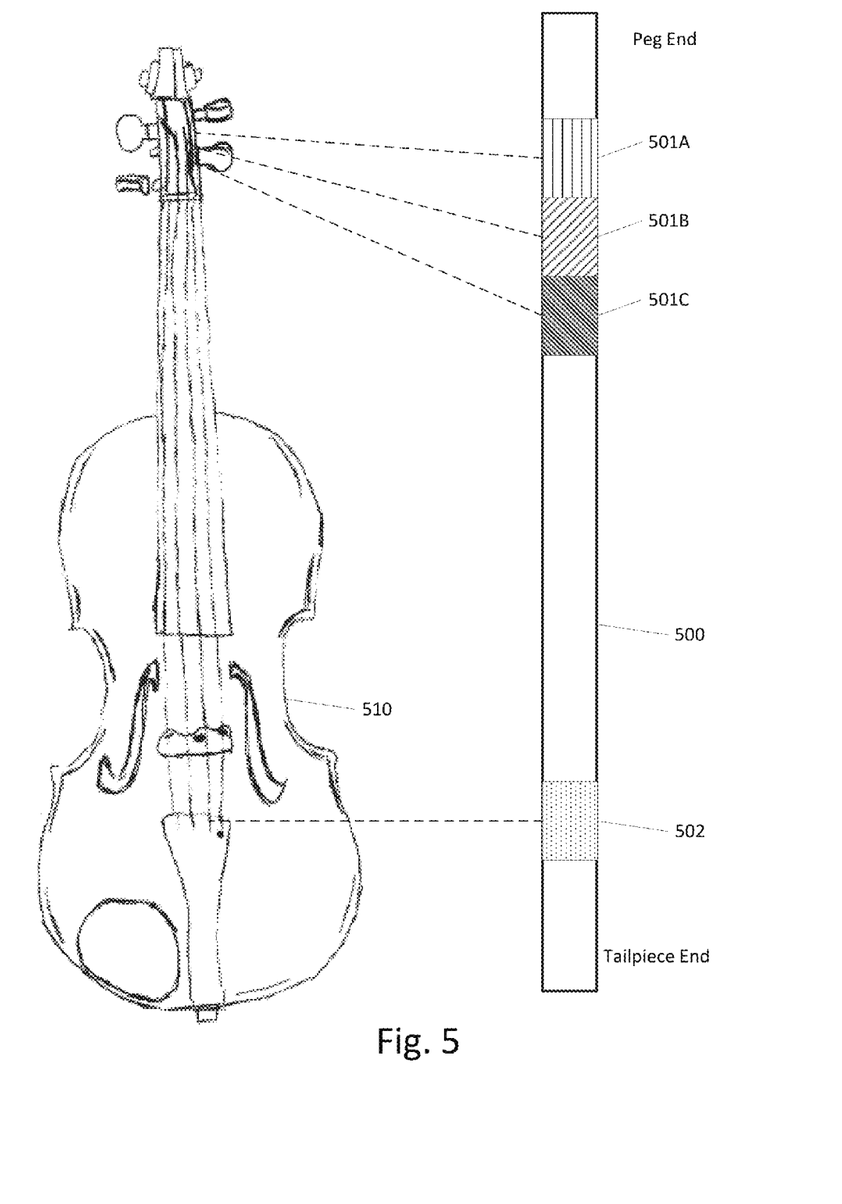
FIG. 5 illustrates an apparatus for music instruction with tension sub-indicators and a note indicator according to a disclosed embodiment.

The tension indicator can be made up of a plurality of sub-indicators, with each of the sub-indicators representing a predetermined level of tension when the end of string is wound into the tuning peg up to position of the sub-indicator. FIG. 5 shows a string 500 with three sub-indicators 501A, 501B, and 501C, which each span a predetermined distance of the string. Although the sub-indicators are shown as different patterns, this is for explanation only, and the sub-indicators can be implemented using colors, such that each of the sub-indicators 501A-501C is a different color, or by using any of the visual or tactile features previously discussed.

The three sub-indicators 501A, 501B, and 501C can be used to represent a low level of tension, a medium level of tension, and a high level of tension, respectively. So, for example, when the peg end of the string 500 is wound into a peg in the peg box up to a point such that the first sub-indicator 501A is not yet completely wrapped around the peg, the level of tension in the string would be low. This is referred to as the flat zone. If the user continues to wind the string 500 into the peg such that it is wound up to a position that falls on the second sub-indicator 501B, then the string will have a medium level of tension. This is referred to as the tuning zone, and means that the string is tuned to the correct pitch for that note. For example, winding an A string into the tuning zone would result in a pitch of approximately 440 Hz. If the string 500 is further wound into the tuning peg up to a position on the third sub-indicator 501 C, then the string will have a high level of tension. This is referred to as the sharp zone. If the user continues to wind the string 500 past the third sub-indicator 501C, then they risk breaking the string. Of course, the sub-indicators do not have to be sharply divided, and can be implemented as an integrated sleeve or strip of colors. For example, the colors on the sleeve can transition from yellow to red to show the transition from flat to sharp.

Also shown in FIG. 5 is the note indicator 502, which can be implemented as a colored strip proximate to the opposite end of string 500. Of course, the note indicator does not have to be proximate to an end and can be placed anywhere on the string 500 where it can be seen or felt by the user. The violin 510 in FIG. 5 is provided for reference to show approximately where the sub-indicators 501-501C and the note indicator 502 would lie on a string that has been attached to the violin 510.

Figure 6:
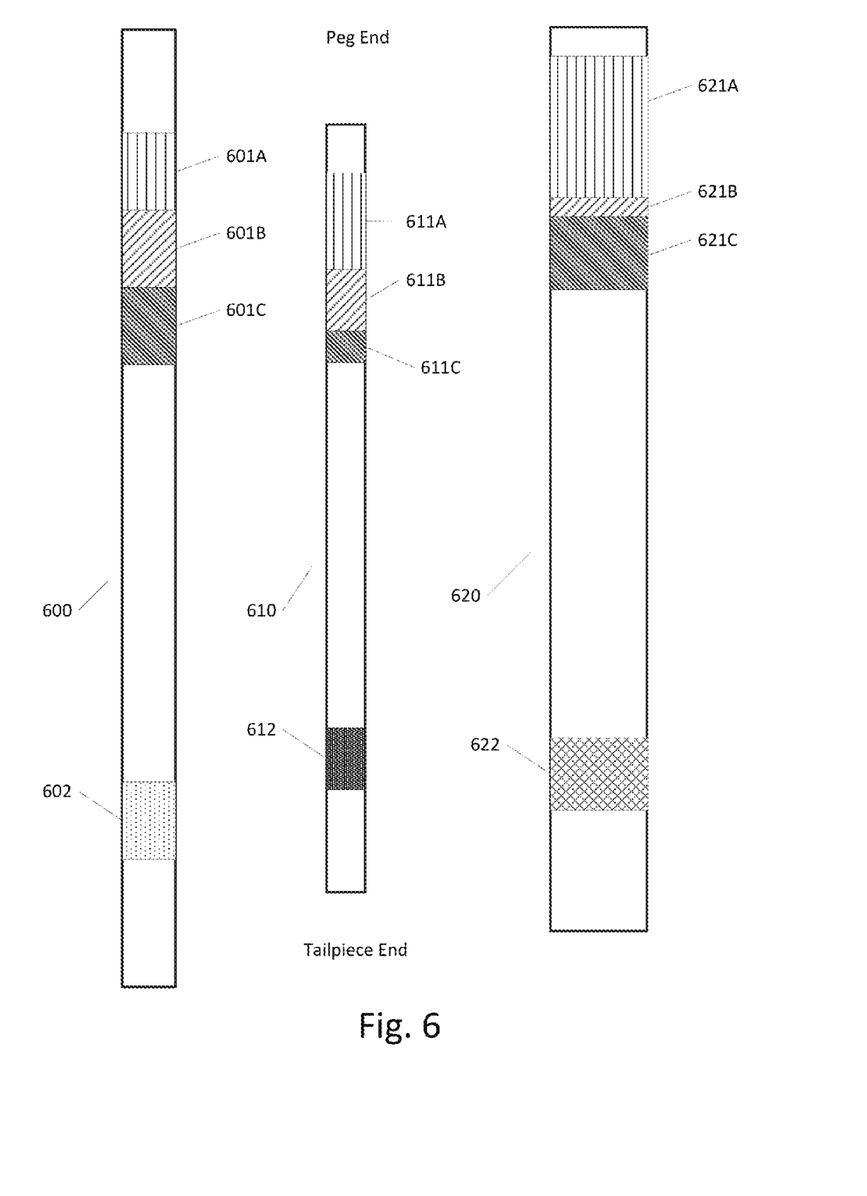
FIG. 6 illustrates an apparatus for music instruction with multiple strings, each string having tension sub-indicators, according to a disclosed embodiment.

FIG. 6 shows an example of three different strings 600, 610, and 620 which correspond to different musical strings.

String 600 has tension sub-indicators 601A-601C and note indicator 602. String 610 has tension sub-indicators 611A-611C and note indicator 612. String 620 has tension sub-indicators 621A-621C and note indicator 622. As shown in the figure, each of the strings can be different lengths and widths, as is usually the case with musical strings. Additionally, the tension sub-indicators are not identical across each of the strings. For example, the sub-indicator 611C corresponding to the sharp zone on string 610 is much smaller than the other sub-indicators 611A-611B on the string 610. Similarly, the sub-indicator 621B corresponding to the tuning zone on string 620 is much smaller than the other sub-indicators 621A and 621C on the string 620.

As discussed earlier, each of the note indicators 602, 612, and 622, on the strings 600, 610, and 620, respectively, represent a different musical note. The note indicators allow users to easily identify which string corresponds to a particular musical note, and the sub-indicators allow students to identify when each of the strings has been overwound and is at risk of breaking, as well as whether each of the strings is in the tuning zone when wound on the corresponding tuning peg in the instrument. When the user plays a string that has been wound into the corresponding tuning peg so that it is in the tuning zone, the musical note corresponding to the note indicator is produced.

Figure 7:
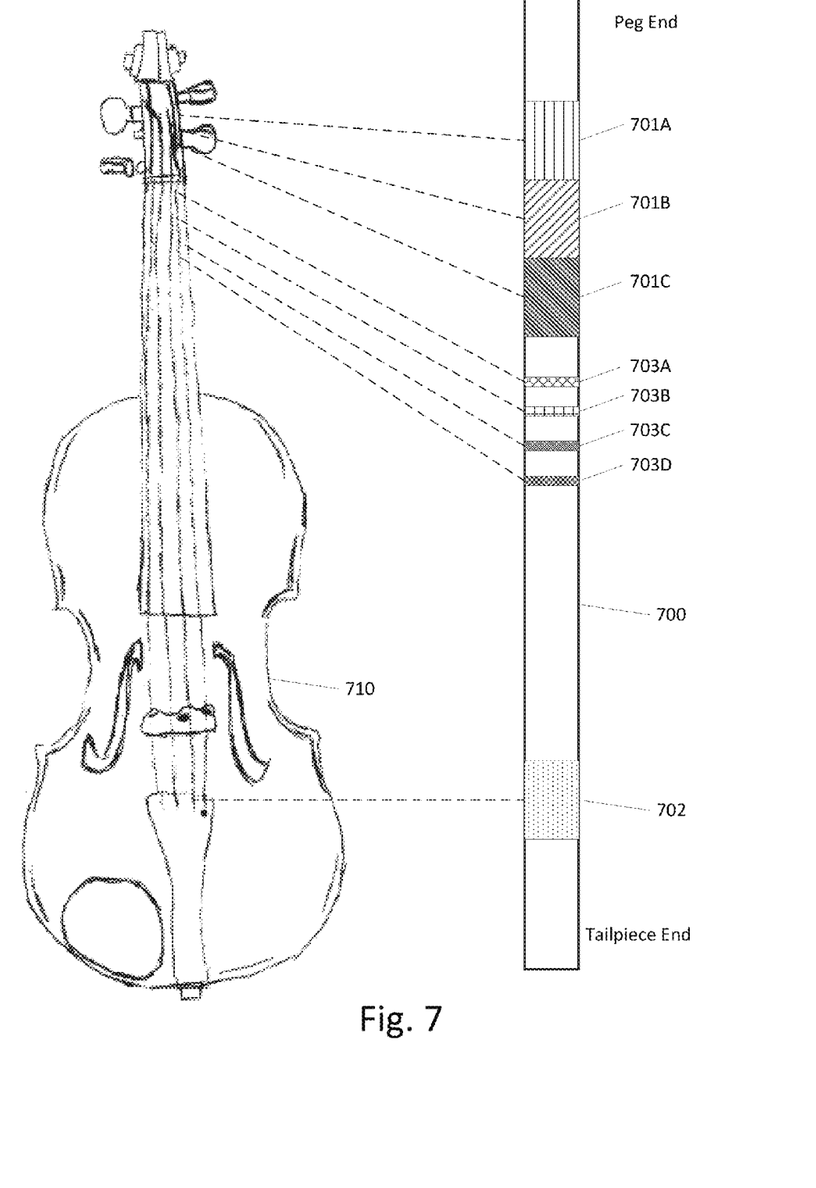
FIG. 7 illustrates an apparatus for music instruction with note modification indicators according to a disclosed embodiment.

Referring now to FIG. 7, a string 700 is shown is with tension sub-indicators 701A-701C and note indicator 702. Also shown are a plurality of note modification indicators 703A-703D disposed on the string. As discussed earlier, each string in a fretless instrument contains a variation of intervals and overtones, which are produced depending on where an instrumentalist places his or her fingers on the fingerboard of the instrument. In many instruments, such as a piano, the keys are spaced in intervals consisting of either whole steps or half steps, making it easier for the user to select the correct pitch. Additionally, guitars have frets which let the guitarist now where to place their fingers and adjust the pitch accordingly. However, on violins, violas, or cellos, which do not have frets, there is no guarantee that an instrumentalist will place his or her finger on the fingerboard exactly one whole step or exactly one half step from the starting pitch. The note modification indicators 703A-703D provide guidelines for the user in this respect. Although the note modification indicators are shown as different patterns, this is for explanation only, and the note modification indicators can be implemented using colors, or by using any of the visual or tactile features previously discussed. Optionally, the note modification indicators can be the same color and the users can differentiate them by position.

When the string 700 is in the instrument 710 and the tension in the string 700 corresponds to the tuning zone, each of the note modification indicators 703A-703D let the user know where to depress the string 700 in order to adjust the pitch of the note produced by string 700 by a predetermined amount corresponding to the note modification indicator. The difference in pitch produced by depressing the string at each of the note modification indicators can be a half-step or full step between adjacent note modification indicators. Each of the four note modification indicators 703A-703D can correspond to a different finger of the user, and each of the four note modification indicators 703A-703D can also be a different color. Once again, instrument 710 is provided as a reference for the approximate locations of the tension sub-indicators 701A-701C, note indicator 702, and note modification indicators 703A-703D on the string 700 when it is in the instrument 710.

Figure 8:
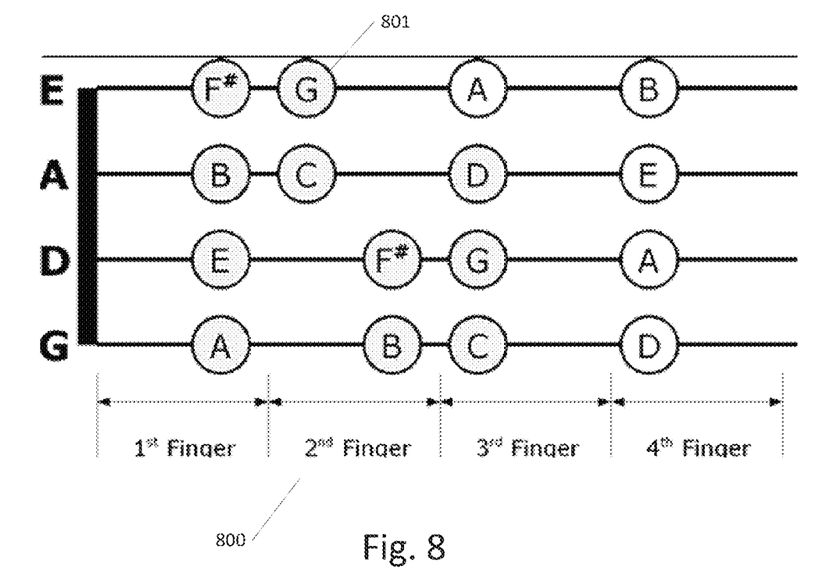
FIG. 8 shows a finger placement chart which indicates approximately where a user must place their finger on each string to adjust the pitch by a predetermined amount.

Referring to FIG. 8, a finger placement chart 800 is shown which indicates approximately where a user must place their finger on each of the strings of a violin, E, A, D, and G, to adjust the pitch of the string and produce a pitch corresponding to the one shown in each of the circles 801. As shown in FIG. 8, each of the note modification indicators would not be placed at the same locations on each of the strings, and the location of each note modification indicator depends on the specific string on which it is disposed.

Figure 9:
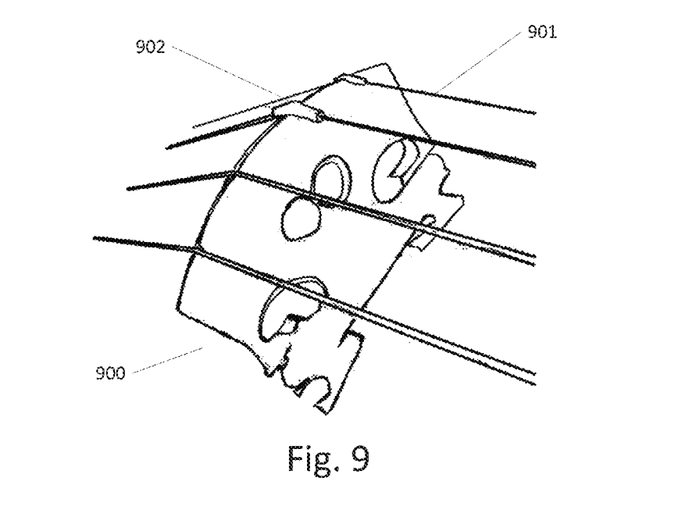
FIG. 9 shows a bridge with strings and a buffer.

FIG. 9 shows a close up view of the bridge 900 on a string instrument such as a violin, viola, or cello. As shown in the figure, the strings 901 contact the bridge 900. Strings frequently break due to excessive friction created when the string is pulled across the bridge 900 in efforts to tune to a desired pitch. A buffer 902 between the strings 901 and the bridge 900 is useful in reducing the amount of friction that the string receives as it is stretched to the appropriate pitch. The buffer 902 can be constructed out of plastic or some other suitable material, such as rubber, cloth, or foam, and can be in the form of a tension ring.

Figure 10:
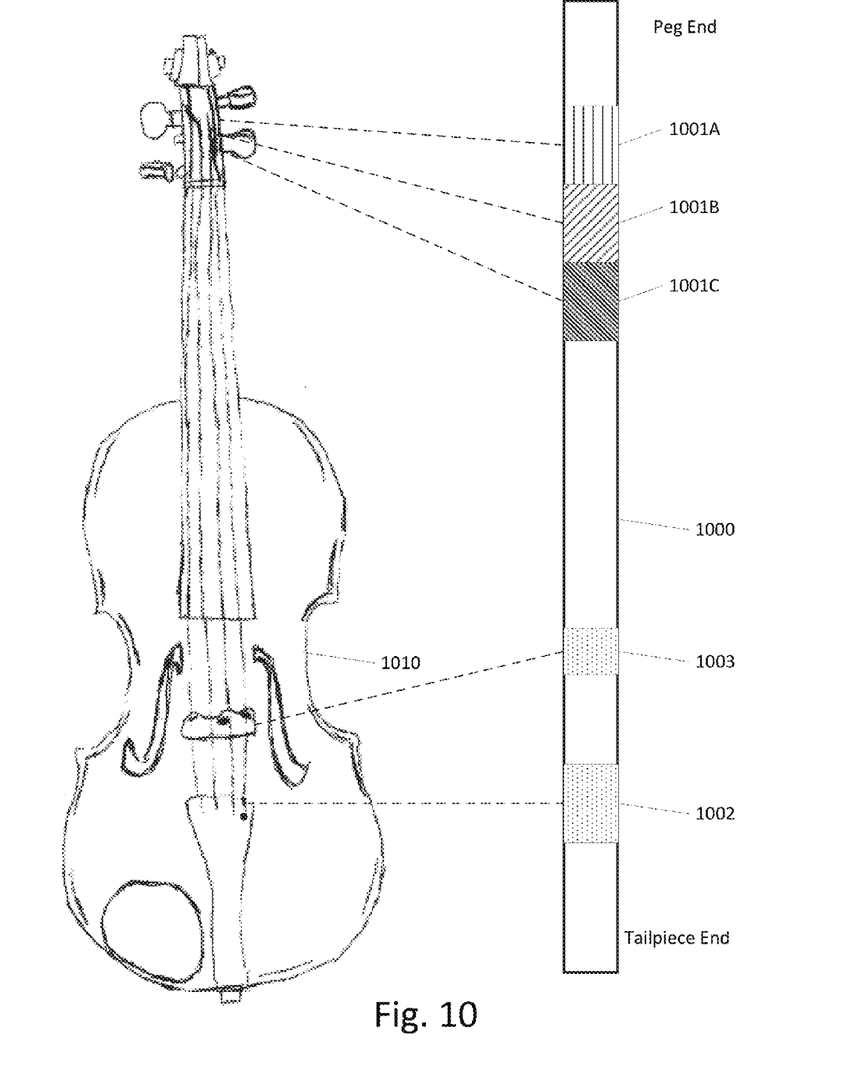
FIG. 10 illustrates an apparatus for music instruction with a buffer according to a disclosed embodiment.

Referring to FIG. 10, a string 1000 is shown with tension sub-indicators 1001A-1001C and note indicator 1002. Also shown is the buffer 1003 disposed on the string 1000. As shown on the instrument 1010, the buffer 1003 resides between the bridge and the string 1000 and prevents the string 1000 from contacting the bridge. Additionally, the buffer 1003 can be represented using the same color or texture that is used for the note indicator 1002. This provides users with a second reference point for identifying the string 1000. When the string 1000 is in the tuned zone, the buffer 1003 lines up with the bridge of the instrument. The buffer can also span a predetermined length of the string, so that the string is protected even when the string is not necessarily in the tuned zone or tuned to the perfect pitch within the tuned zone.

Optionally, the buffer can be a part of the note indicator, or serve as a note indicator as well as a buffer. In this version of the string, the color or texture of the buffer represents the musical note corresponding to the string, and a separate note indicator is not required. Additionally, although not shown in the figures, the buffer can be implemented in conjunction with note modification indicators and other features disclosed herein, so that a string can include tension indicators or tension sub-indicators, note modification indicators, a buffer, and a note indicator, or some combination thereof.

Figure 11:
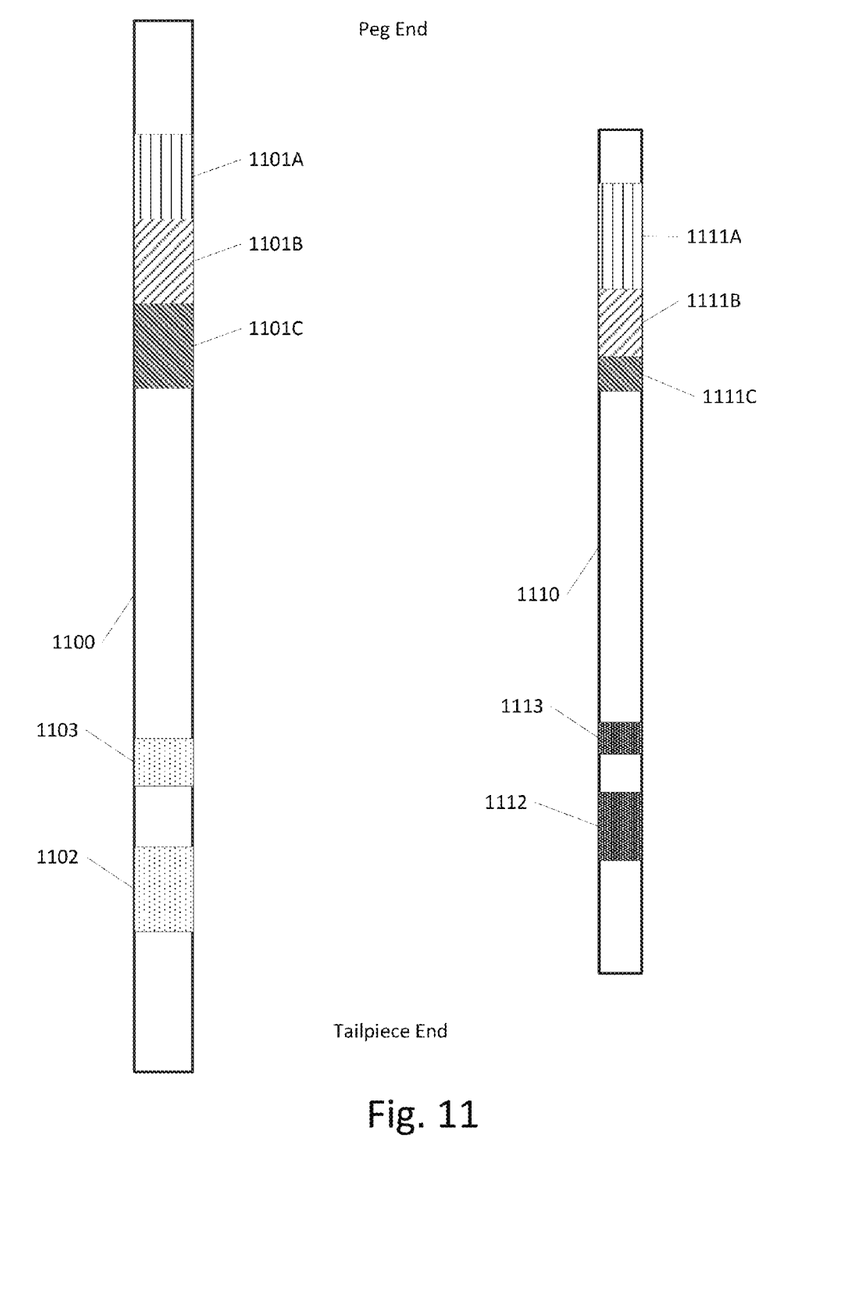
FIG. 11 illustrates an apparatus for music instruction with multiple strings, each string having a buffer, according to a disclosed embodiment.

FIG. 11 shows two strings 1100 and 1110. String 1100 includes tension sub-indicators 1101A-1101C, note indicator 1102, and buffer 1103. String 1110 includes tension sub-indicators 1111A-1111C, note indicator 1112, and buffer 1113. When the strings 1100 and 1110 are in the tuned zone, buffers 1103 and 1113 line up with the bridge of the instrument and with each other.

Although two strings are frequently used in the examples, this for the sake of clarity, as the tension indicators or tension sub-indicators, note modification indicators, note indicators, and buffers can be utilized on a plurality of strings, such as four strings for the violin. Additionally, the position and placement of any of the indicators disclosed herein can be calibrated based on the physical properties of the string. For example, the position of the indicators may change depending on whether the string is made of gut, solid steel, stranded steel, or various synthetic materials.

The apparatus disclosed herein can be associated with a method book, instructions, DVD product demonstration, or product demonstration via online media sources. Strings for the apparatus can be sold individually or in sets of 4 strings (i.e. a violin or bass set includes an E, A, D &G string; a viola or cello set includes an A, D, G & C string).

Instructions may include detailed models and descriptions so that the consumer can check that the strings are properly installed; for example, a diagram may show each color of note indicator alongside the appropriate peg in the peg box of the instrument.

In view of the many possible embodiments to which the principles of our invention may be applied, we claim as our invention all such embodiments as may come within the scope and spirit of the following claims and equivalents thereto.

What is claimed is:

1. A music instruction apparatus comprising:
   a string configured to be wound into a tuning peg of a string instrument;
   a tension indicator disposed on the string proximate to an end of the string, the tension indicator representing a predetermined level of tension in the string when the end of the string is wound into the tuning peg up to the position of the tension indicator;
   a string indicator disposed on the string, the string indicator representing a musical note of the string; and
   a buffer configured to prevent the string from contacting a bridge of the string instrument, wherein the buffer is part of the string indicator and is configured to align with the bridge of the string instrument when the string is in a tuned zone.

2. The music instruction apparatus of claim 1, wherein the tension indicator spans a predetermined distance of the string.

3. The music instruction apparatus of claim 2, wherein the tension indicator represents a predetermined level of tension in the string when the end of the string is wound into the tuning peg up to a position within the span of the tension indicator.

4. The music instruction apparatus of claim 1, wherein the tension indicator comprises a plurality of sub-indicators.

5. The music instruction apparatus of claim 4, wherein each sub-indicator in the plurality of sub-indicators spans a predetermined distance of the string.

6. The music instruction apparatus of claim 4, wherein each sub-indicator in the plurality of sub-indicators is a different color.

7. The music instruction apparatus of claim 4, wherein:
   the plurality of sub-indicators comprise a first sub-indicator, a second sub-indicator, and a third sub-indicator,
   the first sub-indicator representing a low level of tension in the string when the end of the string is wound into the tuning peg up to the position of the first sub-indicator,
   the second sub-indicator representing a medium level of tension in the string when the end of the string is wound into the tuning peg up to the position of the second sub-indicator, and
   the third sub-indicator representing a high level of tension in the string when the end of the string is wound into the tuning peg up to the position of the third sub-indicator.

8. The music instruction apparatus of claim 7, wherein the low level of tension corresponds to a flat zone for the string pitch, the medium level of tension corresponds to the tuned zone for the string pitch, and the high level of tension corresponds to a sharp zone for the string pitch.

9. The music instruction apparatus of claim 8, wherein the musical note is produced when a user plays the string while in the tuned zone.

10. The music instruction apparatus of claim 1, further comprising:
    a plurality of note modification indicators disposed on the string, wherein each note modification indicator in the plurality of note modification indicators represents a position on the string where the user should depress the string in order to adjust the pitch of the musical note by a predetermined amount that corresponds to the note modification indicator.

11. The music instruction apparatus of claim 10, wherein each of the plurality of note modification indicators is a different color.

12. The music instruction apparatus of claim 10, wherein the plurality of note modification indicators comprise four note modification indicators and each note modification indicator corresponds to a different finger.

13. The music instruction apparatus of claim 1, wherein the string indicator spans a predetermined distance of the string.

14. The music instruction apparatus of claim 13, wherein the end is a first end of the string, and wherein the string indicator is disposed proximate to a second end of the string.

15. The music instruction apparatus of claim 1, wherein the string is a first string, the tuning peg is a first tuning peg, the string indicator is a first string indicator, the musical note is a first musical note, and further comprising:
    a second string adapted to be wound into a second tuning peg of the string instrument; and
    a second string indicator disposed on the second string, the second note indicator representing a second musical note different than the first musical note.

16. The music instruction apparatus of claim 15, wherein the first string indicator is a first color and the second string indicator is a second color different than the first color.

17. The music instruction apparatus of claim 16, wherein the buffer is a first buffer configured to prevent the first string from contacting the bridge of the string instrument and further comprising:
    a second buffer configured to prevent the second string from contacting the bridge of the string instrument.

18. The music instruction apparatus of claim 17, wherein the first buffer is a first tension ring and the second buffer is a second tension ring.

19. The music instruction apparatus of claim 17, wherein the first buffer is the first color and the second buffer is the second color.

20. The music instruction apparatus of claim 17, wherein the first buffer is part of the first string indicator and the second buffer is part of the second string indicator.

* * * * *